Dec. 26, 1950     R. A. PRESTON     2,535,599
CABLE CLAMP
Filed Jan. 22, 1947     2 Sheets-Sheet 1
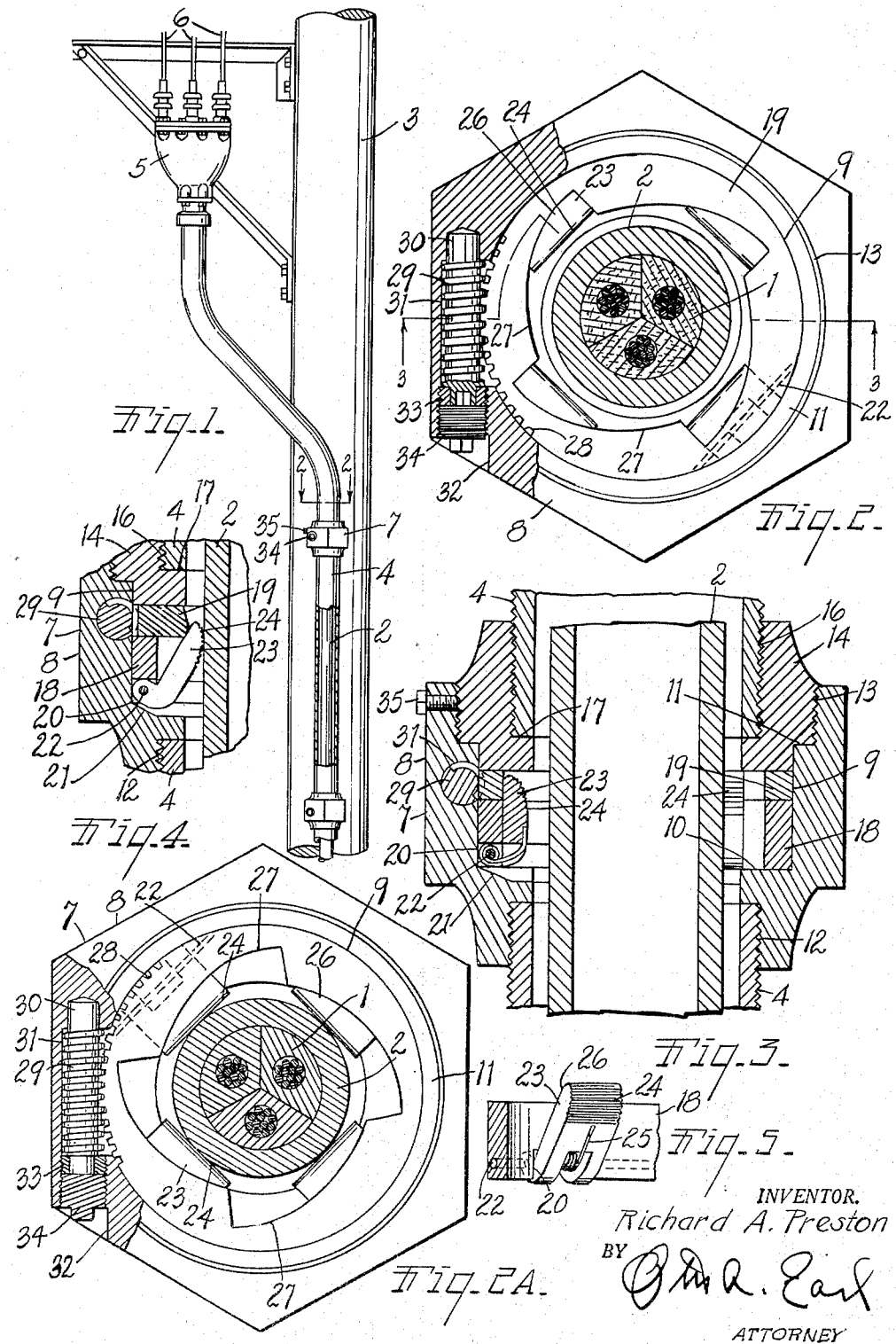
INVENTOR.
Richard A. Preston
BY
ATTORNEY

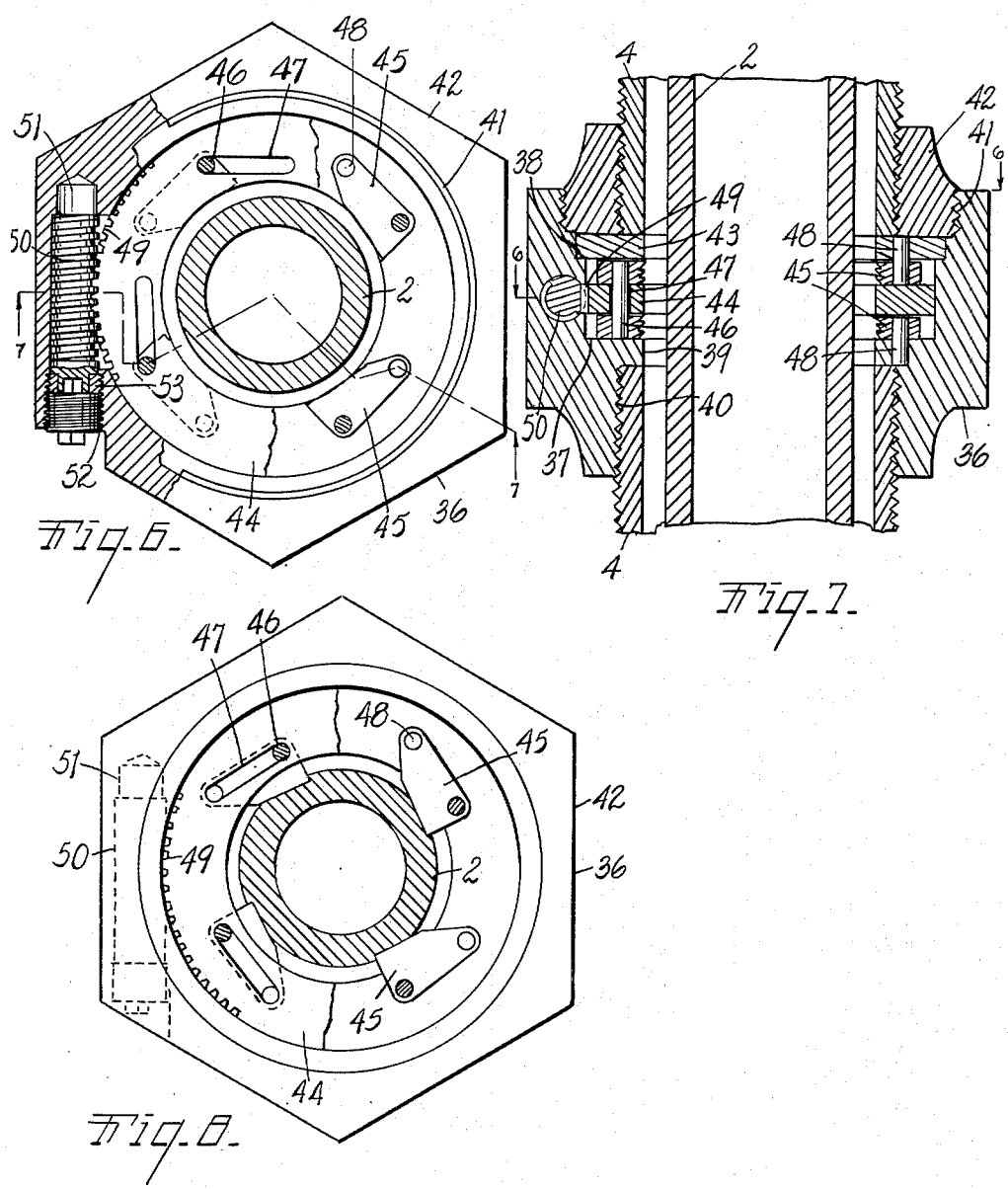

Patented Dec. 26, 1950

2,535,599

UNITED STATES PATENT OFFICE 2,535,599

CABLE CLAMP

Richard A. Preston, Kalamazoo, Mich.

Application January 22, 1947, Serial No. 723,649

17 Claims. (Cl. 285—170)

This invention relates to improvements in a cable clamp.

The principal objects of this invention are:

First, to provide a clamp for gripping an armoured or lead covered cable within a supporting or protecting pipe, which clamp will also function as a coupling for sections of the pipe.

Second, to provide a cable clamp which will form a weatherproof joint between sections of a supporting protective pipe and explosion-proof joint within the definitions of the National Electrical Code.

Third, to provide a clamping device of the type described which will grip a cable simultaneously at several points around the circumference thereof upon adjustment of a single control and which will hold the cable in spaced concentric relationship with a supporting pipe.

Fourth, to provide a clamping device having multiple mechanical advantage features incorporated between the adjusting screw and the gripping members.

Fifth, to provide a clamping device which will have a self-tightening action upon movement of the cable in one direction relative to the supporting pipe.

Sixth, to provide a modified form of cable clamping device which will have a positive gripping action on the cable which permits no relative movement between the cable and the supporting members.

Other objects relating to details and economies of the invention will appear from the description to follow. The invention is defined in the claims.

The drawings of which there are two sheets illustrate a preferred form of the invention and one modified form thereof.

Fig. 1 is a fragmentary elevational view showing a power cable supported upon a pole by a protective pipe and held in the pipe by my coupling device.

Fig. 2 is a cross-sectional view partially broken away along the plane 2—2 in Fig. 1 and showing the clamp in open or non-clamping position with the cover plug removed.

Fig. 2A is a cross-sectional view partially broken away similar to Fig. 2 but illustrating the clamp in tightened or clamping position.

Fig. 3 is a vertical cross-sectional view along the plane 3—3 in Fig. 2.

Fig. 4 is a fragmentary cross-sectional view similar to Fig. 3 but illustrating the clamp in tightened or clamping position.

Fig. 5 is a fragmentary perspective view showing the gripping members and supporting ring used in Figs. 2, 2A, 3, and 4.

Fig. 6 is a plan view partially broken away along the plane 6—6 in Fig. 7 of a modified form of clamp with the cover removed and shown in open or non-clamping position, the cable associated with the clamp being shown in cross-section.

Fig. 7 is a vertical cross-sectional view along the broken plane 7—7 in Fig. 6.

Fig. 8 is a plan view similar to Fig. 6 but showing the clamp in tightened or clamping position.

This invention particularly pertains to clamps for electrical and telephone cables of the lead covered variety where the cables are brought down from a pole or other support to the ground and enter into a building or underground conduits. Cables of this type, particularly in their larger sizes, are very heavy and require support at frequent intervals along their vertical length to prevent the weight of the cable from stretching and damaging either the lead sheath or the conductors and insulation positioned inside the sheath. It is also desirable to protect the relatively soft lead cables along that portion of their length where they may be reached and tampered with by passersby. It is therefore the practice to enclose these vertical leads, as they are called, in iron pipe and to support the cable within the pipe by means of wedges driven between the pipe and cable at the pipe joints. The pipe may then be supported or braced by means that would be inoperative on the soft semi-flexible cables. My clamp may be attached wherever necessary without damaging the cable and clamped or unclamped without opening the outer pipe.

In the drawings I have illustrated a three conductor power cable 1 having its conductor elements and their surrounding insulation enclosed in a lead sheath 2. The cable is shown as extending upwardly along the side of a pole 3 within the protecting and supporting pipe 4 which terminates in a junction box 5 where the conductors are separated as at 6 for attachment to open overhead conductors. The sections of the pipe 4 are joined by the coupling device generally indicated at 7 and the pipes are supported on the pole by any of several types of clamping devices which are not shown on the drawing as they form no part of this invention.

As is most clearly shown in Figs. 2 to 4 the clamp consists of a body portion 8 having a hexagonal outer shape so as to be adjustable by standard wrenches. The interior of the body 8 defines a cylindrical recess 9 terminating at its bottom in an inwardly extending shoulder 10 and at its top in an outwardly extending shoulder 11. The bottom end of the body is internally threaded as at 12 and arranged to mate with the threaded end of a section of the pipe 4 so that the pipe is drawn tight against the under side of the lower shoulder 10. The upper end of the body is threaded internally as at 13 to mate with and receive the annular cap 14 which is shouldered on its lower side as at 15 to engage and overlap the upper shoulder 11 on the body member. The inside of the cap 14 defines the internally threaded aperture 16 arranged to mate with the lower end of a second section of the pipe 4. The upper pipe is drawn down and fits against an annular shoulder 17 extending around the inside of the bottom of the cap 14.

Positioned within the cylindrical cavity 9 in the body 8 and secured between the under surface of the cap 14 and the shoulder 10 is a short cylindrical ring 18 and a cam ring 19, the cam ring being positioned on top of the cylindrical ring. The lower edge of the cylindrical ring 18 is notched at four equally spaced intervals around the periphery thereof as indicated at 20 in Figs. 3 and 4 and the upper surface of the shoulder 10 is correspondingly notched therebelow at 21. Pins 22 are secured in the body of the cylindrical ring and extend across the notches 20 forming supports for the bifurcated ends of the gripping lugs 23. The gripping lugs are bent upwardly at right angles as is most clearly illustrated in Figs. 4 and 5 and have curved inner faces serrated as at 24. Coil springs 25 wound around the pins 22 and having their ends 25 engaged with the lugs constantly urge the upper ends of the lugs radially outwardly of the clamp. The rear surfaces of the lugs 23 are beveled or cammed as at 26 and arranged to engage correspondingly cammed surfaces 27 formed on the inside of the cam rings 19.

The periphery of the cam ring 19 is provided with gear teeth 28 throughout a portion of its length which are engaged by the worm 29 formed on a pin 30. The pin 30 is positioned in a bore 31 extending generally parallel to one side of the hex-shaped body and opening into the adjacent face as at 32. The inner end of the pin is journaled in the body member itself while its outer end is supported in a bearing 33 threadedly connected in the outer end of the bore 31. A protective cap 34 is arranged to be screwed into the end of the bore after the clamp is adjusted.

From the above description it will be noted that the cylindrical ring 18 with the gripping lugs secured thereto and the cam ring and worm pin 30 may all be installed in the body 8 and the cap member 14 screwed into the body and secured in place as by the set screw 35 in Fig. 3, before the clamp is installed on the pipes 4. The threads 12 and 16 are right- and left-hand threads so that the coupling may be attached to adjacent sections of pipe as a union.

After the coupling has been secured to the sections of pipe and the cable positioned therein, the pin 30 may be rotated to turn the cam plate 19 by means of the worm 29. This causes the cam surfaces 27 to force the upper ends of the lugs 23 inwardly of the clamp until the teeth 24 engage and grip the surface of the cable. It will be noted that the clamping operation has the joint mechanical advantage of the worm and gear drive to the cam plate and the cam action against the gripping lugs as well as the lever action of the lugs themselves. The gripping lugs may thus be easily forced against the soft sheath of the cable to tightly grip the cable and hold it relative to the clamp body 8. The lugs may be forced inwardly until their lower portions seat against the surfaces of the notches 21 or they may be only partially tightened allowing relative downward movement of the cable with respect to the body 8 and to more tightly wedge the opposite lugs 23 against the surface of the cable and eventually seat the lower ends of the lugs against the surface of the notches 21 to positively limit the movement of the cable relative to the clamp and the pipes 4. The threaded connections between the pipes and the clamp render the joint substantially weatherproof, and the clamping action is quickly effected by the single adjustment of the pin 30.

In the modified structure illustrated in Figs. 6, 7 and 8, the hexagonal body portion 36 of the clamp defines a shorter cylindrical recess 37 which is outwardly shouldered as at 38 at its top end and inwardly shouldered as at 39 on its lower end. The lower end of the body 36 is internally threaded as at 40 to receive the lower section of the pipe 4 and seat it against the underside of the shoulder 39. The upper end of the body is internally threaded at 41 to receive the cap member 42. As in the preferred form of the invention, the cap member 42 is internally threaded to receive the end of the upper section of pipe 4 and seat it against an annular plate 43 which is clamped against the shoulder 38 by the underside of the cap 42.

Positioned within the cylindrical recess 37 is the annular cam ring 44 which is supported in the center of the recess between four pairs of gripping lugs 45 equally spaced around the recess. Each pair of lugs is joined together by a pin 46 extending through the slots 47 in the cam ring. The opposite ends of the lugs 45 are fixed against radial displacement relative to the cam ring by pins 48 which extend away from the cam ring into holes formed in the shoulder 39 in the body and corresponding holes formed in the annular plate 43 under the cap member 42. The slots 47 extend tangentially with respect to the cam ring so that one end of the slots is closer to the center of the cam ring than the other. The slots thus form cam surfaces engaged with the pins 46.

The periphery of the cam plate 44 is provided with gear teeth as at 49 which are engaged by the worm 50 formed on the pin 51. As in the preferred form of the invention the pin 51 is journaled in a recess parallel to one side of the body and is operable through an aperture 52 in the body 36. A threaded bushing 53 supports the outer end of the pin.

In assembling this clamp the cam ring 44 with the gripping lugs 45 attached thereto by the pins 46 is placed in the recess 37 with the pins 48 on the lower side of the lugs engaged in their proper recess in the body member 36. The annular plate 43 is then dropped into the recess and into proper engagement with the upper pins 48. The cap member 42 is then screwed into the threads 41 at the top of the body member and on top of the annular plate 43. The worm pin 51 may be inserted in the bore 52 and engaged with the cam plate and the threaded bushing 53 installed around the outer end of the pin before or after the cap is installed. The clamp is then ready to be coupled to the adjacent ends of two sections of the pipe 4.

Rotation of the pin 51 in one direction will rotate the cam plate relative to the body 36 and the lug pins 48, causing the pins 46 to travel along the slots 47 and force the edges of the lugs 45 radially inwardly into gripping engagement with the sheath of the cable 2 as is indicated in Fig. 8. Reverse action in the pin 51 will of course disengage the lugs from the cable.

The modified form of clamp has the feature not present in the preferred clamp in that the gripping action of the lugs is immediately positive, since the lugs move radially inwardly in a horizontal plane rather than tilting inwardly as in the first form of the invention. However, the lugs 45 will not have the self-tightening action of the lugs in the first form of the invention and must be sufficiently tightened by turning the pin 51 before the weight of the cable is placed on them. On the other hand, the lugs 23 will press more tightly against the cable as the weight of the cable is applied to them.

Attention is called to the fact that all passages opening into the protective pipe are threaded so that both forms of the clamp are weather-tight and explosion-proof and provide positive gripping action with high mechanical advantage from a single control and also operate to form a union between adjacent sections of the protective pipe 4. The clamps are easily adjustable and may be loosened from outside of the pipe to permit withdrawal of the cable should this be desirable.

Having thus described my invention, what I claim as new and desire to secure by Letters Patent, is:

1. A cable clamp of the type described comprising a hexagonal shaped body portion defining a central cylindrical recess and a tangential bore opening on one face of said body and intersecting said recess, an annular shoulder extending radially outwardly from one end of said recess, an annular flange extending radially inwardly from the other end of said recess, an internally threaded bore extending from one end of said body and adapted to receive the end of a guard pipe against said flange, a second internally threaded bore extending from the opposite end of said body and adapted to receive an annular cap member against said shoulder, an annular cap member adapted to fit said second threaded bore, said cap being internally threaded to receive the end of another guard pipe, a cylindrical lug supporting ring positioned in said recess against the opposite surface of said flange from said first pipe, a cam ring having a cylindrical contour positioned in said recess and adjacent to said lug supporting ring, said lug supporting ring being notched on one end at equally spaced intervals therearound and adapted to pivotally support a plurality of gripping lugs in said notches, a plurality of gripping lugs having end portions pivotally supported in said notches and cable engaging ends extending at an angle thereto, spring means arranged to urge the cable engaging ends of said lugs radially outwardly of said recess, cam surfaces formed on the inner side of said cam ring and arranged to force the cable engaging ends of said lugs radially inwardly upon rotation of said cam ring relative to said lug supporting ring, gear teeth formed along the periphery of said cam ring, a manually operable pin journaled in said tengential bore and having a worm formed thereon engageable with said gear teeth, an externally threaded bushing positioned in said bore and supporting the outer end of said pin whereby said pin is removable through said bore when said bushing is removed, and a closure plug for sealing the end of said bore.

2. A cable clamp of the type described comprising a hexagonal shaped body portion defining a central cylindrical recess and a tangential bore opening on one face of said body and intersecting said recess, an annular shoulder extending radially outwardly from one end of said recess, an annular flange extending radially inwardly from the other end of said recess, an internally threaded bore extending from one end of said body and adapted to receive the end of a guard pipe against said flange, a second internally threaded bore extending from the opposite end of said body and adapted to receive an annular cap member against said shoulder, an annular cap member adapted to fit said second bore, said cap being internally threaded to receive the end of another guard pipe, a cylindrical lug supporting ring positioned in said recess, a cam ring having a cylindrical contour positioned in said recess and adjacent to said lug supporting ring, said lug supporting ring being notched at equally spaced intervals therearound and adapted to pivotally support a plurality of gripping lugs in said notches, a plurality of gripping lugs positioned in said notches and arranged to move from parallel to the axis of said body to radially extending positions, spring means arranged to urge said lugs toward parallel relationship, cam surfaces formed on the inner side of said cam ring and arranged to force the cable engaging ends of said lugs radially inwardly upon rotation of said cam ring relative to said lug supporting ring, gear teeth formed along the periphery of said cam ring, and a manually operable pin journaled in said tangential bore and having a worm formed thereon engageable with said gear teeth.

3. A cable clamp of the type described comprising a hexagonal shaped body portion defining a central cylindrical recess and a tangential bore opening on one face of said body and intersecting said recess, an annular flange extending radially inwardly from one end of said recess, an internally threaded bore extending from one end of said body and adapted to receive the end of a guard pipe, a second internally threaded bore extending from the opposite end of said body and adapted to receive an annular cap member, an annular cap member adapted to fit said other threaded bore, said cap being internally threaded to receive the end of another guard pipe, an annular lug supporting ring positioned in said recess, a cam ring having a cylindrical contour positioned in said recess and adjacent to said annular ring, said annular ring being adapted to pivotally support a plurality of gripping lugs at equally spaced intervals therearound, a plurality of lugs each having one end pivoted on said annular ring about an axis generally tangential to said recess, spring means arranged to urge said lugs into parallel relationship with the axis of said body, cam surfaces formed on the inner side of said cam ring and arranged to force the free ends of said lugs radially inwardly upon rotation of said cam ring relative to said annular ring, gear teeth formed along the periphery of said cam ring, and a pin journaled in said tangential bore and having a worm formed thereon engageable with said gear teeth, said pin being manually rotatable through the open end of said tangential bore to effect rotation of said cam ring.

4. A clamp adapted to join adjacent sections of a guard pipe and support a cable therewithin comprising a body member having a hexagonal outer shape and defining a cylindrical central recess, said body further defining internally threaded apertures at the opposite ends thereof opening coaxial into said recess, one of said apertures being adapted to receive the end of one section of said guard pipe, the other of said apertures being arranged to receive a cap member, an annular cap member adapted to fit said other aperture, said cap member being internally threaded to receive the end of the other of said guard pipes, an inwardly extending shoulder formed along one end of said recess and at the opposite end thereof from said cap, a lug supporting ring and a cam ring positioned in said recess and retained against axial movement between said shoulder and the bottom of said cap member, gripping lugs pivotally supported on said lug ring and adapted to swing inwardly from positions parallel to the axis of said recess toward radially disposed positions, cam surfaces formed on said cam ring arranged to force the free ends of said lugs radially inwardly into gripping engagement with a cable extending through said pipes, gear means formed on the outer periphery of said cam ring and screw means journaled in said body and engageable with said gear means for rotating said screw means, said screw means being operable from outside of said body.

5. A clamp adapted to join adjacent sections of a protective pipe and support a cable therewithin comprising a body member having a hexagonal outer shape and defining a cylindrical central recess, said body further defining apertures at the opposite ends thereof opening coaxial into said recess, one of said apertures being adapted to threadedly receive the end of one section of said guard pipe, an annular cap having a threaded connection with the opposite end of said body, said cap member being internally threaded to receive the end of the other of said guard pipe sections, an inwardly extending shoulder formed along one end of said recess and at the opposite end thereof from said cap, a lug supporting ring and a cam ring positioned in said recess and retained against axial movement between said shoulder and the bottom of said cap member, gripping lugs pivotally supported on said lug ring and adapted to swing inwardly from positions parallel to the axis of said recess toward radially disposed positions, cam surfaces formed on said cam ring arranged to force the free ends of said lugs radially inwardly into gripping engagement with a cable extending through said pipes, gear means formed on the outer periphery of said cam ring and screw means journaled in said body and engageable with said gear means for rotating said screw means, said screw means being operable from outside of said body.

6. A clamp adapted to join adjacent sections of a guard pipe and support a cable therewithin comprising a body member defining a cylindrical central recess, said body further defining apertures at the opposite ends thereof opening coaxial into said recess, one of said apertures being adapted to threadedly receive the end of one section of said guard pipe, an annular cap member having a threaded connection with the opposite end of said body, said cap member being internally threaded to receive the end of the other of said guard pipe sections, gripping lugs pivotally supported at spaced intervals around said recess and adapted to swing from positions parallel to the axis of said recess toward radially disposed positions, a cam ring rotatable within said recess, cam surfaces formed on said cam ring arranged to force the free ends of said lugs radially inwardly into gripping engagement with a cable extending through said pipes, gear means formed on the outer periphery of said cam ring and screw means journaled in said body and engageable with said gear means for rotating said screw means, said screw means being operable from outside of said body.

7. A clamp of the type described comprising a body member having a hexagonal outer shape and defining a passage therethrough, a cap member threadedly secured to one end of said body member and defining one end of a cylindrical recess therein, said body and cap being internally threaded and adapted to join adjacent sections of guard pipe as a union, a lug supporting member positioned in said recess, gripping lugs pivotally supported on said supporting member and about axes normal to radii of said recess, a cam member rotatable within said recess about the axis of said body and operative upon the free ends of said lugs for pressing said lugs inwardly and a screw member operable from the outside of said body for imparting rotative motion to said cam member.

8. A clamp of the type described comprising a body member defining a passage therethrough, a cap member threadedly secured to one end of said body member and defining one end of a cylindrical recess in said body, said body and cap being internally threaded and adapted to join adjacent sections of guard pipe as a union, a lug supporting member positioned in said body, gripping lugs pivotally supported on said supporting member, a cam member rotatable within said recess and operative upon the free ends of said lugs for pressing said lugs inwardly, and a screw member operable from the outside of said body for imparting rotative motion to said cam member.

9. A clamp of the type described comprising a body member defining a passage therethrough, a cap member threadedly secured to one end of said body member and defining one end of a cylindrical recess therein, said body and cap being internally threaded and adapted to join adjacent sections of guard pipe as a union, gripping lugs pivotally supported in said recess, cam means rotatable within said recess and operative upon the free ends of said lugs for pressing said lugs inwardly, and screw means operable from the outside of said body for imparting rotative motion to said cam means.

10. A clamp of the type described comprising a body member defining a passage therethrough, a cap member threadedly secured to one end of said body member, and defining one end of a cylindrical recess in said body, said body and cap being internally threaded and adapted to join adjacent sections of guard pipe as a union, lug supporting means positioned in said body, gripping lugs pivotally supported on said supporting means about axes parallel to the axis of said body, cam means rotatable within said recess and engageable with the free ends of said lugs for pressing said lugs inwardly, and screw means operable from the outside of said body for imparting rotative motion to said cam means.

11. A clamp of the type described comprising a body member defining a passage therethrough, a cap member threadedly secured to one end of said body member and defining one end of a cylindrical recess therein, said body and cap being internally threaded and adapted to join adjacent sections of guard pipe as a union, gripping lugs pivotally supported in said recess about axes parallel to the axis of said body, a cam member rotatable within said recess and operable upon with the free ends of said lugs for pressing said lugs inwardly, and a screw member operable from the outside of said body for imparting rotative motion to said cam member.

12. A clamp of the type described comprising a body member defining a passage therethrough, a cap member secured to said body, said body and cap being internally threaded to join the adjacent ends of like sections of a guard pipe, and clamping members retained in said body by said cap and operable to grip a cable extending through said body.

13. A clamp of the type described comprising a body member having a hexagonal outer surface and defining a cylindrical recess, said body further defining internally threaded apertures opening into each end of said recess, an annular shoulder extending outwardly from one end of said recess, an annular flange extending inwardly from the other end of said recess, a cam ring rotatable within said recess and having gear teeth formed on the periphery thereof, a plurality of pairs of gripping lugs positioned in said recess, the lugs of each pair being disposed on opposite sides of said cam ring, said cam ring defining a plurality of slots normal to radii of said ring, cam pins extending through said slots and connecting the two lugs of each of said pairs of lugs pivot pins for each of said lugs, the pivot pins for the lugs on one side of said cam ring being journaled in said annular flange, an annular plate positioned on said annular shoulder and defining journals for the pivot pins of the lugs on the opposite side of said cam ring, an annular cap member threadedly positioned in one of said apertures of said body and retaining said annular plate against said shoulder, and a pin having a worm formed thereon journaled in a portion of said body and engageable with the teeth on said cam ring, said pin manually operable from the outside of said body whereby rotation of said cam ring causes said cam pins to rotate the ends of said lugs radially inwardly of said recess, said cap being internally threaded and adapted to cooperate with the other threaded aperture in said body to join two sections of a guard pipe coaxially with said recess.

14. A clamp of the type described comprising a body member defining a cylindrical recess, said body further defining apertures opening into each end of said recess, an annular shoulder extending outwardly from one end of said recess, a second annular shoulder extending inwardly from the other end of said recess, a cam ring rotatable within said recess and having teeth formed on the periphery thereof, said cam ring defining a plurality of slots normal to radii of said ring, a plurality of gripping lugs positioned in said recess, said lugs being disposed in flat parallel relationship to said cam ring, cam pins extending through said slots and connected to said lugs, pivot pins for each of said lugs journaled in said second annular shoulder, an annular cap member threadedly joined with said body and retaining said cam ring and lugs in said recess, and a pin having a worm formed thereon journaled in a portion of said body and engageable with the teeth on said cam ring, said pin being manually operable from the outside of said body whereby rotation of said cam ring causes said cam pins to rotate the ends of said lugs radially inwardly of said recess, said body and cap being internally threaded and adapted to join two sections of a guard pipe coaxially with said recess.

15. A clamp of the type described comprising a body member defining a cylindrical recess, said body further defining apertures opening into each end of said recess, an annular shoulder extending outwardly from one end of said recess, a second annular shoulder extending inwardly from the other end of said recess, a cam ring rotatable within said recess and having gear teeth formed on the periphery thereof, said cam ring defining a plurality of slots normal to radii of said ring, a plurality of gripping lugs positioned in said recess, said lugs being disposed in flat parallel relationship to said cam ring, cam pins extending through said slots and connected to said lugs, pivot pins for each of said lugs, an annular plate positioned on said first annular shoulder and defining journals for said pivot pins, an annular cap member threadedly joined with said body and retaining said annular plate against said shoulder, and a pin having a worm formed thereon journaled in a portion of said body and engageable with the teeth on said cam ring, said pin being manually operable from the outside of said body whereby rotation of said cam ring causes said cam pins to rotate the ends of said lugs radially inwardly of said recess, said body and cap being internally threaded and adapted to join two sections of a guard pipe coaxially with said recess.

16. A clamp of the type described comprising a body member defining a recess therethrough, an annular cap engageable with one end of said body, said body and said cap being internally threaded and adapted to join two sections of guard pipe as a union, a plurality of gripping lugs pivotally supported in said body about axes parallel to the axis of said recess and equally spaced therearound, an annular cam member rotatably positioned in said recess and defining gear teeth along its periphery, said cam ring having cam surfaces engageable with the free ends of said lugs for moving said lugs radially of said recess, and a pin having a worm formed thereon journaled in said body and engageable with said gear teeth for rotating said cam plate, said pin being manually operable from outside of said body.

17. A clamp of the type described comprising a body member defining a recess therethrough, said body being internally threaded and adapted to join two sections of guard pipe as a union, a plurality of gripping lugs pivotally supported in said body about axes parallel to the axis of said recess and equally spaced therearound, an annular cam member rotatably positioned in said recess and defining gear teeth along its periphery, said cam ring having cam surfaces engageable with the free ends of said lugs for moving said lug radially of said recess, and a pin having a worm formed thereon journaled in said body and engageable with said gear teeth for rotating said cam plate, said pin being manually operable from outside of said body.

RICHARD A. PRESTON.

REFERENCES CITED

The following references are of record in the file of this patent:

UNITED STATES PATENTS

| Number | Name | Date |
|---|---|---|
| 1,144,626 | Wigle | June 29, 1915 |
| 1,464,396 | Rowland | Aug. 7, 1923 |
| 1,821,096 | Hicks et al. | Sept. 1, 1931 |